United States Patent [19]
Wank et al.

[11] Patent Number: 5,733,651
[45] Date of Patent: Mar. 31, 1998

[54] LAMINATES COMPRISING A COLORED LAYER AND THERMOPLASTIC LAYERS HAVING SPECIFIC THICKNESS

[75] Inventors: Joachim Wank, Dormagen; Peter Bier, Krefeld; Bernd Post, Moers, all of Germany

[73] Assignee: Bayer Aktiengesellschaft, Leverkusen, Germany

[21] Appl. No.: 494,110

[22] Filed: Jun. 23, 1995

[30] Foreign Application Priority Data

Jul. 8, 1994 [DE] Germany .................. 44 24 106.2

[51] Int. Cl.⁶ .................. B32B 27/36; B32B 27/40
[52] U.S. Cl. .................. 428/339; 428/412; 428/423.1
[58] Field of Search .................. 428/412, 332, 428/423.1, 339

[56] References Cited

U.S. PATENT DOCUMENTS

| | | | |
|---|---|---|---|
| 4,368,231 | 1/1983 | Egert et al. | 428/220 |
| 4,558,106 | 12/1985 | Kawakami et al. | 526/216 |
| 4,707,396 | 11/1987 | Wank et al. | 428/216 |
| 5,047,486 | 9/1991 | Savariar | 525/394 |
| 5,055,345 | 10/1991 | Wank et al. | 428/215 |

*Primary Examiner*—H. Thi Le
*Attorney, Agent, or Firm*—Connolly and Hutz

[57] ABSTRACT

Laminates of a thickness of 0.2 mm to 20 mm consisting of

- a film made of thermoplastic of a thickness of 0.02 mm to 0.8 mm,
- a colored layer, the softening temperature of which is above that of the film made of thermoplastic (1),
- optionally a polyurethane layer which is tack-free at room temperature and
- a layer of thermoplastic of a thickness of 0.1 mm to 19 mm which in turn consists of one or more layers of plastic.

4 Claims, No Drawings

LAMINATES COMPRISING A COLORED LAYER AND THERMOPLASTIC LAYERS HAVING SPECIFIC THICKNESS

FIELD OF THE INVENTION

The invention relates to laminates comprising a thermoplastic layer, a colored layer, optionally a polyurethane layer, and a further thermoplastic layer.

SUMMARY OF THE INVENTION

The present invention provides laminates of a thickness of 0.2 mm to 20 mm consisting of 1. a film made of thermoplastic of a thickness of 0.02 mm to 0.8 mm,
2. a colored layer, the softening temperature of which is above that of the film made of thermoplastic (1),
3. a polyurethane layer which is tack-free at room temperature and
4. a layer of thermoplastic of a thickness of 0.1 mm to 19 mm consisting of one or more layers of plastic, wherein layer 3 may optionally also be omitted.

DESCRIPTION OF PREFERRED EMBODIMENTS

Films made from thermoplastic (1) which are suitable according to the invention are, for example, such films made from known thermoplastic aromatic polycarbonates with weight average molecular weights $\overline{M}_w$ of 25,000 to 200,000, preferably of 30,000 to 120,000 and in particular of 30,000 to 80,000 ($\overline{M}_w$ determined from $\eta_{rel}$ in $CH_2Cl_2$ at 20° C. and a concentration of 0.5 g per 100 ml) and such films made from known thermoplastic polyaryl sulphones, which may be linear (see DE-OS 27 35 144) or branched (see DE-OS 27 35 092 or DE-OS 23 05 413).

Suitable linear polyaryl sulphones are any known aromatic polysulphones or polyether sulphones having $\overline{M}_w$ (weight average molecular weight measured, for example, by light scattering) of between approximately 15,000 and approximately 55,000, preferably between approximately 20,000 and approximately 40,000. Such polyaryl sulphones are described, for example, in DE-OS 17 19 244 or U.S. Pat. No. 3,365,517.

Suitable branched polyaryl sulphones are in particular the branched polyaryl ether sulphones according to DE-OS 23 05 413 or U.S. Pat. No. 3,960,815, the $\overline{M}_w$ of which (weight average molecular weight measured, for example, by light scattering) are between approximately 15,000 and approximately 50,000, preferably between approximately 20,000 and 40,000. (See DE-AS 30 10 143 for further details in this connection).

Films made from thermoplastic cellulose esters, thermoplastic polyvinyl chlorides and thermoplastic styrene/acrylonitrile copolymers are also suitable.

Suitable cellulose esters are obtained using customary processes by esterifying cellulose with aliphatic monocarboxylic acid anhydrides, preferably acetic and butyric or acetic and propionic anhydrides. The hydrolysis to be performed in the crude solution is controlled by a slight excess of water in such a manner that a low hydroxyl content (4 to 25) is obtained. Oxidative bleaching of the cellulose ester isolated from the solution must be performed in such a manner that no oxidising agent may be detected in the finished product; post-treatment with reducing agents must, if necessary, be performed. In order to determine the OH value of the esters, the free hydroxyl groups of the cellulose esters are esterified with acetic anhydride in pyridine, the excess anhydride reacted with water and back-titrated [method: C. J. Mahn, L. B. Genung and R. F. Williams, *Analysis of Cellulose Derivatives, Industrial and Engineering Chemistry*, vol. 14, n° 12, 935–940 (1942)].

The viscosity of suitable cellulose esters should be 0.3 to 0.5 Poise, measured as a 20 wt. % solution in acetone. In the case of acetobutyrates, preferably used cellulose esters have an acetic acid content of 17 to 23 wt. % and a butyric acid content of 45 to 50 wt. %, in the case of acetopropionates they have a propionic acid content of 61 to 69 wt. % and an acetic acid content of 2 to 7 wt. %. OH values are customarily between 4 and 25. The weight average molecular weight $\overline{M}_w$ are between 10,000 and 1,000,000, preferably between 100,000 and 500,000.

Thermoplastic polyvinyl chlorides which are suitable according to the invention are, for example, commercially available grades of PVC.

Thermoplastic styrene/acrylonitrile copolymers which are suitable according to the invention are copolymers of styrene preferably with acrylonitrile which are, for example, obtained by suspension polymerisation in the presence of catalysts from the monomers or mixture of monomers having a molecular weight ($\overline{M}_w$) of 10,000 to 600,000 ( $\overline{M}_w$ is measured in DMF at C=5 g/l and 20° C.). Literature references in this connection are *Beilsteins Handbuch der organischen Chemie*, 4th edition, third supplement, volume 5, pages 1163–1169, Springer Verlag 1964, H. Ohlinger, *Polystyrol 1. Teil, Herstellungsverfahren und Eigenschaften der Produkte*, Springer Verlag (1955).

Reference may be made to DE-OS 25 17 033 and to DE-OS 25 31 240 in relation to production of the films (1).

One side of the films (1) may be provided with a matt or structured surface. This is achieved by extruding the thermoplastic melt through a slot die and drawing the melt web off over a chill roll having a matt or structured surface.

The films may also have one polished side and one matt side.

The thickness of the films is preferably 0.05 to 0.8 mm.

Suitable colored layers according to the invention are produced using inks or lacquers, preferably screen printing inks based on polycarbonate, having a softening temperature above that of the film made of thermoplastic (1) and containing pigments and/or dyes.

Suitable polycarbonates are, for example, those based on linear polycarbonates having a molecular weight $\overline{M}_w$ (weight average) of at least 10,000, preferably of 20,000 to 300,000 and which contain difunctional carbonate structural units of the formula (I)

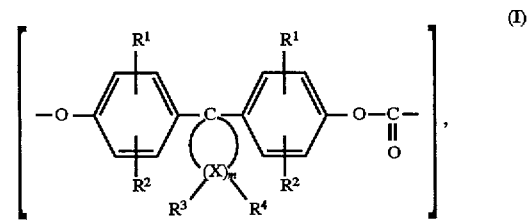

in which
R¹ and R² mutually independently mean hydrogen, halogen, preferably chlorine or bromine, $C_1$–$C_8$ alkyl, $C_5$–$C_6$ aryl, preferably phenyl, and $C_7$–$C_{12}$ aralkyl, preferably phenyl-$C_1$–$C_4$-alkyl, in particular benzyl, m means an integer from 4 to 7, preferably 4 or 5, $R^3$ and $R^4$ mutually independently, individually selectably for each X mean hydrogen or $C_1$-$C_6$ alkyl and X means carbon providing that on at least one atom $X R^3$ and $R^4$ simultaneously mean alkyl.

Starting products for the polycarbonates are dihydroxy-diphenylcycloalkanes of the formula (Ia)

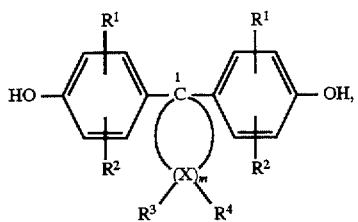

in which

X, $R^1$, $R^2$, $R^3$, $R^4$ and m have the meaning stated for the formula (I).

$R^3$ and $R^4$ are preferably simultaneously alkyl on 1 to 2 atoms X, in particular on only one atom X.

Methyl is the preferred alkyl residue; the X atoms in α position relative to the diphenyl-substituted C atoms (C-1) are preferably not dialkyl-substituted, while alkyl disubstitution in β position relative to C-1 is preferred.

Dihydroxydiphenylcycloalkanes having 5 and 6 ring carbon atoms in the cycloaliphatic residue (m=4 or 5 in formula Ia) are preferred, for example the diphenols of the formulae (Ib) to (Id),

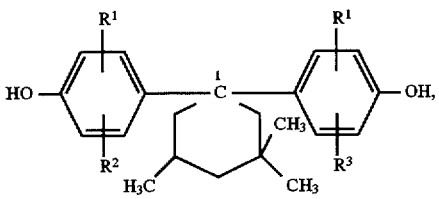

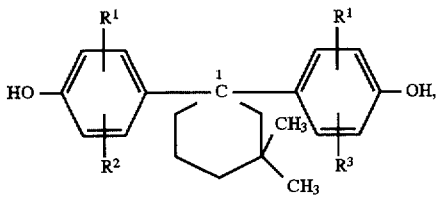

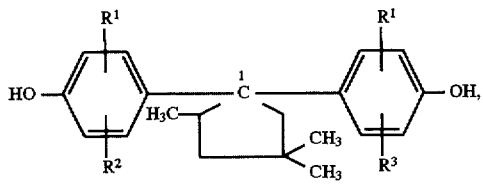

wherein 1,1-bis-(4-hydroxyphenyl)-3,3,5-trimethylcyclohexane (formula Ib where $R^1$ and $R^2$ are H) is particularly preferred. The polycarbonates A may be produced in accordance with European patent 395 953 from diphenols of the formula (Ia).

It is possible to use both a single diphenol of the formula (Ia) to yield homopolycarbonates and two or more diphenols of the formula (Ia) to yield copolycarbonates.

The diphenols of the formula (Ia) may moreover also be used mixed with other diphenols, for example with those of the formula (Ie)

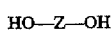   (Ie)

to produce high molecular weight, thermoplastic, aromatic polycarbonates.

Other suitable diphenols of the formula (Ie) are those in which Z is an aromatic residue with 6 to 30 C atoms, which may contain one or more aromatic rings, may be substituted and may contain aliphatic residues or cycloaliphatic residues other than those of the formula (Ia) or heteroatoms as bridging members.

Examples of diphenols of the formula (Ie) are: hydroquinone, resorcinol, dihydroxydiphenyls, bis-(hydroxyphenyl)alkanes, bis-(hydroxyphenyl)cycloalkanes, bis-(hydroxyphenyl)sulphides, bis-(hydroxyphenyl)ethers, bis-(hydroxyphenyl)ketones, bis-(hydroxyphenyl) sulphones, bis-(hydroxyphenyl)sulphoxides, α,α'-bis-(hydroxyphenyl)diisopropylbenzenes together with the ring-alkylated and ring-halogenated compounds thereof.

These and further suitable diphenols are, for example, described in U.S. Pat. Nos. 3,028,365, 2,999,835, 3,148,172, 2,991,273, 3,271,367, 3,062,781, 2,970,131 and 2,999,846, in DE-A 1 570 703, 2 063 050, 2 063 052, 2 211 956, in FR-A 1 561 518 and in the monograph by H. Schnell *Chemistry and Physics of Polycarbonates*, Interscience Publishers, New York, 1964.

Examples of other preferred diphenols are: 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, α,α-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl)cyclohexane, α,α-bis-(3,5-dimethyl-4-hydroxyphenyl)-p-diisopropylbenzene, 2,2-bis-(3,5-dichloro-4-hydroxyphenyl)propane and 2,2-bis-(3,5-dibromo-4-hydroxyphenyl)propane.

Examples of particularly preferred diphenols of the formula (Ie) are: 2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane and 1,1-bis-(4-hydroxyphenyl) cyclohexane.

2,2-Bis-(4-hydroxyphenyl)propane is in particular preferred. The other diphenols may be used both individually and as mixtures.

The molar ratio of diphenols of the formula (Ia) to the other diphenols of the formula (Ie) which are optionally also to be used should be between 100 mol. % of (Ia):0 mol. % of (Ie) and 2 mol. % of (Ia):98 mol. % of (Ie), preferably between 100 mol. % of (Ia):0 mol. % of (Ie) and 5 mol. % of (Ia):95 mol. % of (Ie) and in particular between 100 mol. % of (Ia):0 mol. % of (Ia):90 mol. % of (Ie) and very particularly between 100 mol. % of (Ia):0 mol. % of (Ie) and 20 mol. % of (Ia) to 80 mol. % of (Ie).

The high molecular weight polycarbonates made from the diphenols of the formula (Ia), optionally combined with other diphenols, may be produced using known polycarbonate production processes. The various diphenols may here be linked together both randomly and in blocks.

The polycarbonates according to the invention may be branched in a manner known per se. If branching is desired, it may be achieved in a known manner by incorporating small quantities, preferably quantities of between 0.05 and 2.0 mol. % (relative to the diphenols used) of trifunctional or greater than trifunctional compounds, in particular such compounds with three or more phenolic hydroxyl groups. Some branching agents with three or more phenolic hydroxyl groups are: phloroglucinol, 4,6-dimethyl-2,4,6-tri-(4-hydroxyphenyl)hept-2-ene, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis-(4-hydroxyphenyl)cyclohexyl]propane, 2,4-bis-(4-hydroxyphenylisopropyl)phenol, 2,6-bis-(2-hydroxy-5-methylbenzyl)-4-methylphenol, 2-(4-hydroxyphenyl)-2-(2,4-dihydroxyphenyl)propane, hexa-[4-(4-hydroxyphenylisopropyl)phenyl]-ortho-terephthalic acid ester, tetra-(4-hydroxyphenyl)methane, tetra-[4-(4-hydroxyphenylisopropyl)phenoxy]methane and 1,4-bis-[4',4''-dihydroxytriphenyl)methylbenzene.

Some other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in customary concentrates may be used as chain terminators to regulate molecular weight in a manner known per se. Suitable compounds are, for example, phenol, tert.-butylphenols or other alkyl-$C_1$-$C_7$-substituted phenols. In particular, small quantities of phenols of the formula (If) are suitable for molecular weight regulation

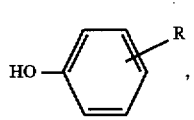

in which

R denotes a branched $C_8$ and/or $C_9$ alkyl residue.

The proportion of $CH_3$ protons in the alkyl residue R is preferably between 47 and 89% and the proportion of CH and $CH_2$ protons between 53 and 11%; R is also preferably in o- and/or p-position relative to the OH group and the upper limit of the ortho proportion is particularly preferably 20%. The chain terminators are generally used in quantities of 0.5 to 10, preferably of 1.5 to 8 mol. %, relative to the diphenols used.

The polycarbonates may preferably be produced using the phase interface process (c.f. H. Schnell *Chemistry and Physics of Polycarbonates, Polymer Reviews*, vol. IX, pages 33 et seq., Interscience Publ. 1964) in a manner known per se.

In this process, the diphenols of the formula (Ia) are dissolved in an aqueous alkaline phase. In order to produce copolycarbonates with other diphenols, mixtures of diphenols of the formula (Ia) and the other diphenols, for example those of the formula (Ie), are used. Chain terminators, for example of the formula (If) may be added to regulate molecular weight. The diphenols are then reacted with phosgene in the presence of an inert organic phase, which preferably dissolves polycarbonate, using the phase interface condensation method. The reaction temperature is between 0° C. and 40° C.

The optionally used branching agents (preferably 0.05 to 2.0 mol. %) may either be introduced into the aqueous alkaline phase with the diphenols or added dissolved in the organic solvent before phosgenation. In addition to the diphenols of the formula (Ia) and optionally other diphenols (Ie), the mono- and/or bis-chloroformic acid esters thereof may also be used, wherein these are added dissolved in organic solvents. The quantity of chain terminators and of branching agents is then dependent upon the molar quantity of diphenolate residues of the formula (Ia) and optionally of formula (Ie); if chloroformic acid esters are also used, the quantity of phosgene may be reduced accordingly in a known manner.

Suitable organic solvents for the chain terminators and optionally for the branching agents and the chloroformic acid esters are, for example, methylene chloride, chlorobenzene, acetone, acetonitrile, together with mixtures of these solvents, in particular mixtures of methylene chloride and chlorobenzene. The chain terminators and branching agents used may optionally be dissolved in the same solvent.

The organic phase used for the phase interface polycondensation reaction is, for example, methylene chloride, chlorobenzene together with mixtures of methylene chloride and chlorobenzene.

The aqueous alkaline phase used is, for example, an NaOH solution. Production of the polycarbonates using the phase interface process may be catalysed in a customary manner with catalysts such as tertiary amines, in particular tertiary aliphatic amines such as tributylamine or triethylamine; the catalysts may be used in quantities of 0.05 to 10 mol. %, relative to the molar quantity of diphenols used. The catalysts may be added before the beginning of phosgenation or during or also after phosgenation.

The polycarbonates may be produced using the known homogeneous phase process, the so-called "pyridine process" as well as by the known melt transesterification process for example using diphenyl carbonate instead of phosgene. The polycarbonates preferably have a molecular weight $M_w$ (weight average, determined by gel chromatography after prior calibration) of at least 2,000, particularly preferably of 20,000 to 300,000 and in particular of 20,000 to 80,000. They may be linear or branched, they are homopolycarbonates or copolycarbonates based on the diphenols of the formula (Ia).

Incorporation of the diphenols of the formula (Ia) has yielded novel polycarbonates with elevated heat resistance, which also have otherwise good properties. This particularly applies to the polycarbonates based on the diphenols of the formula (Ia) in which m is 4 or 5 and very particularly to the polycarbonates based on the diphenols (Ib), in which $R^1$ and $R^2$ mutually independently have the meaning stated for formula (Ia) and are particularly preferably hydrogen.

Particularly preferred polycarbonates are thus those in which m is 4 or 5 in the structural units of the formula (I) and very particularly those prepared from units of the formula (Ig)

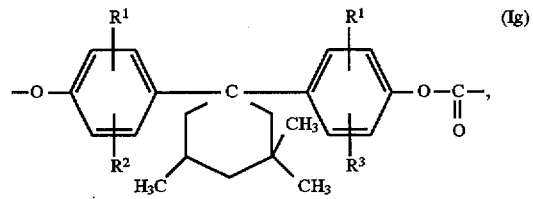

in which $R^1$ and $R^2$ have the meaning stated for formula (I), but are particularly preferably hydrogen.

These polycarbonates based on diphenols of the formula (Ib), in which $R^1$ and $R^2$ are in particular hydrogen, also have, in addition to elevated heat resistance, good UV stability and good melt flow behaviour, which is not to be expected.

Moreover, by means of any desired formulation with other diphenols, in particular with those of the formula (Ie) the properties of the polycarbonate may be favourably varied. In such copolycarbonates, the polycarbonates contain the diphenols of the formula (Ia) in quantities of 100 mol. % to 2 mol. %, preferably in quantities of 100 mol. % to 5 mol. % and in particular in quantities of 100 mol. % to 10 mol. % and very particularly of 100 mol. % to 20 mol. %, relative to the total quantity of 100 mol. % of diphenol units.

In addition to the described screen printing inks based on polycarbonate, such inks based on polyarylates may also be used for the colored layers suitable according to the invention.

Suitable polyarylates are, for example, those based on 1,1-bis-(4-hydroxyphenyl)alkylcycloalkanes.

Polyarylates may, for example, be produced according to EP-A 443 058 from a) aromatic diphenols on the one hand and b1) aliphatic, cycloaliphatic or aromatic dicarboxylic acids and optionally b2) carbonic acid, wherein b1) is present in a quantity of 0.1 to 100 mol. % and b2) optionally in a quantity of 0 to 99.9 mol. %, relative to b1)+b2), and a) consists of 0.1 to 100 mol. % of diphenols of the above-stated formula (Ia).

These polyarylates, for example polyesters and polyester carbonates, have surprising advantages over known polyesters and polyester carbonates, such as for example those prepared from bisphenol A and from 1,1-bis-(4-hydroxyphenyl)cyclohexane.

They thus exhibit surprisingly high glass transition temperatures $T_g$, even at low contents of incorporated bisphenols of the formula (Ia). They furthermore also exhibit particularly good mould release behaviour, even at low contents of incorporated bisphenols of the formula (Ia).

Moreover, taking account of the elevated glass transition temperature $T_g$, they exhibit extraordinarily good melt flow. The polyesters and polyester carbonates according to the invention are additionally particularly resistant to tracking and hydrolysis and are insensitive to stress cracking, in particular even when in contact with petroleum spirits and oils. Their low tendency to crystallise is also surprising.

Preferred bisphenols of the formula (Ia) in this case are:

1,1-bis-(4-hydroxyphenyl)-3,3-dimethyl-5-methylcyclohexane, 1,1-bis-(4-hydroxyphenyl)-3,3-dimethyl-5,5-dimethylcyclohexane, 1,1-bis-(4-hydroxyphenyl)-3,3-dimethyl-4-methylcyclohexane, 1,1-bis-(4-hydroxyphenyl)-3,3-dimethyl-5-ethylcyclohexane, 1,1-bis-(4-hydroxyphenyl)-3,3-dimethyl-5-methylcyclopentane, 1,1-bis-(3,5-dimethyl-4-hydroxyphenyl)-3,3-dimethyl-5-methylcyclohexane, 1,1-bis-(3,5-diphenyl-4-hydroxyphenyl)-3,3-dimethyl-5-methylcyclohexane, 1,1-bis-(3-methyl-4-hydroxyphenyl)-3,3-dimethyl-5-methylcyclohexane, 1,1-bis-(3-phenyl-4-hydroxyphenyl)-3,3-dimethyl-5-methylcyclohexane, 1,1-bis-(3,5-dichloro-4-hydroxyphenyl)-3,3-dimethyl-5-methylcyclohexane, 1,1-bis-(3,5-dibromo-4-hydroxyphenyl)-3,3-dimethyl-5-methylcyclohexane.

Aromatic diphenols which may be used in addition to those of the formula (Ia) to synthesise the polyarylates are, for example: hydroquinone, resorcinol, dihydroxydiphenyls, bis-(hydroxyphenyl)alkanes, bis-(hydroxyphenyl)cycloalkanes, bis-(hydroxyphenyl)sulphides, bis-(hydroxyphenyl)ethers, bis-(hydroxyphenyl)ketones, bis-(hydroxyphenyl)sulphones, α,α'-bis-(hydroxyphenyl)isopropylbenzenes, pentamethyl(hydroxy)indanols, together with corresponding ring-substituted compounds.

Preferred diphenols are: hydroquinone, bis-(4-hydroxyphenyl), 2,2-bis-(4-hydroxyphenyl)propane, bis-(4-hydroxyphenyl)sulphide, bis-(4-hydroxyphenyl)ether, bis-(4-hydroxyphenyl)ketone, bis-(4-hydroxyphenyl)sulphone, bis-(4-hydroxyphenyl)methane, 1,1-bis-(4-hydroxyphenyl)cyclohexane, α,α'-bis-(4-hydroxyphenyl)-p-diisopropylbenzene, 1,1-bis-(4-hydroxyphenyl)-1-phenylethane, 2,2-bis-(3-methyl-4-hydroxyphenyl)propane, 2,2-bis-(3,5-dichloro-4-hydroxyphenyl)propane, 2,2-bis-(3,5-dibromo-4-hydroxyphenyl)propane, 2,2-bis-(3,5-dimethyl-4-hydroxyphenyl)propane, bis-(3,5-dimethyl-4-hydroxyphenyl)methane, 2,2-bis-(3,5-dimethyl-4-hydroxyphenyl)butane, bis-(3,5-dimethyl-4-hydroxyphenyl) and 1,1,3,4,6-pentamethyl-3-(3,5-dimethyl-4-hydroxyphenyl)indan-5-ol, particularly preferably bis-(4-hydroxyphenyl), 2,2-bis-(4-hydroxyphenyl)propane and 2,2-bis-(3,5-dimethyl-4-hydroxyphenyl)propane, very particularly preferably 2,2-bis-(4-hydroxyphenyl)propane.

Aliphatic, cycloaliphatic or aromatic dicarboxylic acids b1), which are suitable for synthesis of the polyesters according to the invention, are for example: oxalic acid, malonic acid, succinic acid, glutaric acid, adipic acid, pimelic acid, suberic acid, azelaic acid, sebacic acid, nonanedicarboxylic acid, decanedicarboxylic acid, dodecanedicarboxylic acid, octadecanedicarboxylic acid, dimethylmalonic acid, dimer fatty acid, 1,4-cyclohexanedicarboxylic acid, tetrahydroterephthalic acid, tetrahydroisophthalic acid, tetrahydrophthalic acid, 3,6-endomethylenetetrahydrophthalic acid, o-, m-, p-phenylenediacetic acid, orthophthalic acid, terephthalic acid, isophthalic acid, tert.-butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyl ether dicarboxylic acid, 4,4'-diphenylsulphonedicarboxylic acid, 2,2-bis-(4-carboxyphenyl)propane, trimethyl-3-phenylindane-4,5-dicarboxylic acid.

The polyarylates are preferably produced from aromatic dicarboxylic acids. Of the aromatic dicarboxylic acids, terephthalic acid and/or isophthalic acid are particularly preferably used. Terephthalic acid is very particularly preferred.

Preferred polyarylates are those in which 1 to 100 mol. %, preferably 5 to 100 mol. % and in particular 10 to 100 mol. % of the diphenols are of the formula (Ia).

Particularly preferred polyester carbonates are those which contain the dicarboxylic acids (component b1)) in a quantity of 5 to 98 mol. %, preferably of 15 to 95 mol. %, particularly preferably of 20 to 50 mol. % and 60 to 95 mol. % and in particular of 25 to 45 mol. % and 80 to 95 mol. %, relative to the total of the dicarboxylic acids b1) and the carbonic acid b2).

Inks or lacquers, preferably screen printing inks, containing pigments and/or dyes may be produced from the polyarylates, for example polyesters and polyester carbonates, the softening temperature of which is above that of the film made of thermoplastic.

The colored layer (2) is preferably applied using the screen printing process.

Screen printing processes are taken to mean squeezing inks or lacquers through a woven screen clamped in a frame, the meshes of which screen are partially closed depending upon the pattern to be printed. The remaining apertures in the woven screen correspond to the printed image.

The thickness of the colored layer is 3 to 50 μm.

Polyurethane layers (3) which are suitable according to the invention may be produced both using aqueous dispersions of preferably polyester polyurethanes which dry to yield transparent films and using organic solutions of preferably linear polyester polyurethanes which dry to yield transparent films and which optionally contain a more highly functional polyisocyanate as crosslinking agent. Suitable polyurethane dispersions are, for example, those based on linear polyester diols, aromatic or aliphatic diisocyanates and optionally customary chain extenders produced also using ionic structural components according to U.S. Pat. No. 3,479,310 or DE-AS 14 95 847. Aqueous dispersions of preferably linear polyester polyurethanes having carboxylate and sulphonate groups as may be obtained according to DE-OS 28 04 609 are also very suitable. When organic solutions of preferably linear polyester polyurethanes are used, it is solutions of non-ionic linear polyester polyurethanes in suitable solvents which are preferably considered. These polyurethanes are preferably reaction products of (i) aromatic diisocyanates such as 2,4- and/or 2,6-diisocyanatotoluene, 4,4'-diisocyanatodiphenylmethane, hexamethylene diisocyanate, isophorone diisocyanate or 1,5-diisocyanatonaphthalene or the mixtures thereof with (ii) polyester diols of the molecular weight ($\overline{M}_w$) range of 1,000 to 4,000, in particular based on adipic acid and suitable glycols, such as ethylene glycol, 1,4-dihydroxybutane, 1,6-dihydroxyhexane and the mixtures thereof and optionally (iii) chain extenders, for example the last-stated glycols, wherein the reactants are used while maintaining an NCO/OH equivalent ratio of 0.9:1 to 1:1.1, preferably of 0.95:1 to 1:1, and wherein 0.1 to 2 mol of chain extender or chain extender mixture are used per mol of polyester diol. Suitable solvents for such polyester polyurethanes are, for example, ethyl acetate, butyl acetate, methyl ethyl ketone, methyl isobutyl ketone or mixtures consisting of such solvents. The dispersions or solutions are generally used at a solids content of 10 to 40 wt. %. It may often be convenient to incorporate subordinate quantities of a more highly functional polyisocyanate, for example tris-(6-isocyanatohexyl)biuret, into the stated solutions in order to improve the mechanical properties of the polyurethane film which is finally obtained.

The polyurethane layer (3) may either be applied to the film continuously using the roll coater or coating knife process, or alternatively using the screen printing process after the colored layer. The quantity of the polyurethane dispersion or solution is generally calculated such that dry film thicknesses of 2 to 80 μm, preferably of 15 to 30 μm are obtained.

The polyurethane layers (3) constitute completely tack-free thermoplastic layers at room temperature.

The thermoplastic layer (4) preferably consists of thermoplastic polymethyl methacrylate, thermoplastic acrylonitrile/butadiene/styrene copolymer, thermoplastic polystyrene, thermoplastic polycarbonate, thermoplastic styrene/acrylonitrile copolymer or thermoplastic cellulose ester. (The latter three thermoplastics are also suitable for the film (1)).

The thermoplastic layer (4) may either be a single-ply layer, or a multi-ply plastic layer comprising individual layers of various plastics each of a thickness of 0.050 to 5 mm.

Thermoplastic polymethyl methacrylates suitable for layer (4) are, for example, commercially available grades of Plexiglas.

Thermoplastic acrylonitrile/butadiene/styrene copolymers are in particular blends of a) 50 to 70 wt. % of one or more graft products and b) 95 to 30 wt. % of one or more thermoplastic resins.

Graft products (a) are preferably polymers obtained by polymerisation of graft monomers in the presence of a rubber as the grafting backbone. The rubber content is preferably 5 to 80 wt. % and is also dependent upon the polymerisation process.

Grafting backbones which may be considered are in particular polybutadiene, natural rubber, butadiene/acrylonitrile copolymers and butadiene/styrene copolymers and block polymers. Acrylic ester/vinyl ether polymers and EPDM terpolymers may also be used. Graft monomers are principally styrene, mixtures of styrene and acrylonitrile preferably in a weight ratio of 90:10 to 50:50, mixtures of styrene and methyl (meth)acrylate, preferably in a weight ratio of 5:95 to 95:5, and styrene/acrylonitrile/methyl (meth) acrylate blends.

The production of such graft products is known per se. The graft monomers may be polymerised in an emulsion in the presence of a rubber latex. The graft reaction is then initiated with a free-radical initiator. If the rubber is partially crosslinked and if certain quantity ratios of graft monomers and grafting backbones are maintained during the grafting reaction, the size of the rubber particles in the latex determines the particle size of the resultant graft polymer. The grafted shell consisting of chains of the polymer of the graft monomers chemically bonded to the rubber particles is relatively thin and does not substantially change the size of the rubber particle. The size is here taken to mean the $d_{50}$ value, i.e. the diameter both above and below which 50% of the diameters of the particles lie. The graft reaction is incomplete, so that its product is described as a graft product. In addition to the actual graft polymer, the product also contains ungrafted copolymers of the graft monomers.

The graft polymers may also be produced by bulk/solution or bulk/suspension polymerisation, preferably from monomer-soluble rubber. The size of the rubber particles is then established in the phase inversion stage and may be influenced mechanically (by stirring) and by chemical alteration of the phase equilibrium (addition of dispersants). In general, particles of a diameter of 1 μm or greater are obtained in bulk/solution graft processes. The rubber content of the graft product is limited to a maximum of 25 wt. %.

Products may be used according to the invention, the particles of which have a size of 0.05 to 20 μm and those in which a considerable proportion of the graft monomers is included within the rubber particles as homo- or copolymer. Preferred particle sizes are 0.05 to 1.2 μm, in particular 0.05 to 0.6 μm. It is also possible to use two or more different graft products in conjunction, for example two graft products differing in their degree of grafting (or graft density), in particle size or in both simultaneously. It is, for example, particularly suitable to use a mixture of a graft product with particles of a $d_{50}$ size of 0.35 to 10 μm and a graft product with particles of a $d_{50}$ size of 0.05 to 0.32 μm (ABS polymers produced in this manner are described as bimodal systems).

The graft products preferably contain 35 to 80 wt. %, in particular 40 to 70 wt. %, of rubber and have $d_{50}$ particle sizes of 0.1 to 0.5 μm. They are used in a quantity such that the finished ABS polymer contains 5 to 25 wt. %, preferably 5 to 20 wt. %, of rubber.

The thermoplastic resin (b) forming the second constituent of the ABS polymer constitutes the continuous matrix and is a polymer or copolymer of styrene, α-methylstyrene/acrylonitrile/methyl (meth)acrylate or maleic anhydride. Preferred resins are polystyrene, styrene/acrylonitrile copolymers with an acrylonitrile content of 20 to 35 wt. % together with α-methylstyrene/acrylonitrile copolymers with an acrylonitrile content of 20 to 31 wt. %. The weight average molecular weight of these resins is 50,000 to 550,000; the molecular polydispersity U is 1.0 to 3.5.

$$\left(\frac{M}{M}-1=U\right)$$

If a single graft product is used, it is advantageous if the quantitative composition of the graft monomers and that of the resin are similar or identical. If a mixture of two graft products of different particle sizes is used, it is advantageous if the quantitative composition of the graft monomers of the graft product having the coarser particles differs from the composition of the resin. α-Methylstyrene cannot be grafted in combination with acrylonitrile, but is only to be used in the resin.

The thermoplastic resins, for example styrene/acrylonitrile or α-methylstyrene/acrylonitrile copolymers may be produced using known processes, for example by bulk polymerisation, solution polymerisation, suspension polymerisation and emulsion polymerisation.

The graft product and thermoplastic resin are frequently produced separately, generally both by emulsion polymerisation. If the components are in the form of a latex, the latices may be mixed and precipitated together.

Thermoplastic polystyrenes suitable for the production of the thermoplastic layer (4) are homopolymers of styrene or copolymers of styrene preferably with acrylonitrile and/or butadiene and/or maleic acid esters, which are, for example, obtained by suspension polymerisation of the monomers or mixture of monomers in the presence of catalysts with $\overline{M}_w$ of 10,000 to 600,000 ($\overline{M}_w$ is measured in DMF at c=5 g/l and 20° C.). (Literature references in this connection are *Beilsteins Handbuch der organischen Chemie*, 4th edition, third supplement, volume 5, pages 1163–1169, Springer Verlag 1964, H. Ohlinger, *Polystyrol* 1. *Teil, Herstellungsverfahren und Eigenschaften der Produkte*, Springer Verlag, 1955).

The thermoplastic layer (4) may be applied by insert molding onto layers 1+2 or 1+2+3 using known processes (c.f. DE-OS 27 55 088).

The thickness of the thermoplastic layer (4) is preferably 0.1 to 19 mm.

The present invention also provides a process for the production of the laminates from layers 1+2 +4 and optionally 3, which is characterised in that films made of thermoplastics are coated by screen printing with a colored layer and optionally with a polyurethane layer and are finally injection-backed or laminated in a known manner with a thermoplastic layer.

Composite films bonded with polyurethanes are known (DE-OS 25 17 032 and DE-AS 30 10 143).

Insert molding of thermoplastic films with thermoplastics is also known (DE-OS 27 55 088), as is insert molding of thermoplastic films with a colored interlayer (DE-OS 35 28 812).

Laminates made from polycarbonates and glass which contain polyurethane interlayers are known from DE-OS 15 94 164. These laminates may, for example, be used as windscreens for motor vehicles. DE-OS 15 94 164 does not address the issue of coloring these laminates.

One object of the invention is to simplify the production of laminates containing printed images and to improve the laminates themselves because:

1. Components which are ready for installation, i.e. provided with the final decoration, are taken from the injection moulding machine.
2. The printed decoration is protected from smearing and abrasion because it lies between the cover film and the support layer.
3. Due to the ink/lacquer base, the printed decoration is resistant to higher temperatures than the support film and is not damaged by further processing (insert molding).
4. Production of the laminates is particularly simple.
5. Properties may be varied within broad limits by appropriate selection of materials.

The laminates according to the invention may, for example, be used for heating and ventilation deflectors in motor vehicles, light switches and for household, audio and TV appliances.

EXAMPLE 1

Decoration is screen printed with an ink based on polycarbonate with an $\eta_{rel}$ (measured in $CH_2Cl_2$ at 25° C. and a concentration of 0.5 g/100 ml) produced from 30 mol. % of bisphenol A and 70 mol. % of 1,1-bis-(4-hydroxyphenyl)-3,3,5-trimethylcyclohexane onto the matt side of a 200 μm gauge film made from thermoplastic diphenol A homopolycarbonate ($\eta_{rel}$=1.31, measured in $CH_2Cl_2$ at 25° C. and a concentration of 0.5 g/100 ml) which is structured on one side and matt on the other.

The printed film is shaped according to DE-OS 38 40 542 in accordance with the contours of the finished part. The printed and shaped film is stamped out in accordance with the shape of the finished part and laid in the open injection mould such that the structured side of the polycarbonate film faces the injection point for the thermoplastic.

The film may be held in the mould by a static electric charge or by a vacuum. Once the mould has been closed, bisphenol A polycarbonate with an $\eta_{rel}$ of 1.3 (measured in $CH_2Cl_2$ at 20° C. and a concentration of 0.5 g/100-ml) is injected. The total thickness of the laminate is 6 mm.

EXAMPLE 2

Example 1 is repeated. After printing of the decoration, an aqueous dispersion of a polyurethane based on polybutylene adipate with a molecular weight $\overline{M}_w$ of 4,000 and on a mixture of hexamethylene diisocyanate and isophorone diisocyanate is applied by screen printing. The film is shaped, stamped and laid in the injection mould in accordance with example 1.

Once the mould has been closed, an acrylonitrile/butadiene/styrene copolymer having an $\eta_{rel}$ of 1.4, which was obtained by copolymerisation of 50 wt. % of acrylonitrile, 20 wt. % of butadiene and 30 wt. % of styrene according to DAS 28 27 594, is injected in a known manner.

EXAMPLE 3

Example 2 is repeated, wherein the polycarbonate film used is a 200 μm gauge polycarbonate film polished to a high gloss on one side and matt on the other, made from the bisphenol A homopolycarbonate of example 1.

Once the colored decorative layer has been printed, the polyurethane layer is applied by screen printing and then insert molded with thermoplastic polycarbonate ($\overline{M}_w$ 40,000).

The total thickness of the laminate is 8 mm.

EXAMPLE 4

Example 1 is repeated, wherein the ink used is an ink based on polyarylate produced from 1,1-bis-(4-hydroxyphenyl)-3,3,5-trimethylcyclohexane and isophthaloyl chloride in a 1:1 molar ratio. The resin on which the screen printing ink is based has an $\eta_{rel}$ of 1.24 (measured in $CH_2Cl_2$ at 25° C., c=5 g/l of solution) and a $T_g$ of 256° C. (measured by DTA).

What is claimed is:

1. A laminate having a thickness of 0.2 to 20 mm consisting of the following layers:
   1. a thermoplastic film having a thickness of 0.02 to 0.8 mm;
   2. a colored layer in contact with the thermoplastic layer 1;
   3. optionally a polyurethane layer which is tack-free at room temperature; and
   4. a thermoplastic layer having a thickness of 0.1 to 19 mm, consisting of one or more layers of plastic, in contact with the colored layer 2, or if present, the polyurethane layer 3, wherein the colored layer 2 has a softening temperature above that of thermoplastic layer 1.

2. Process for the production of a laminate according to claim 1, wherein a thermoplastic is coated by screen printing with a colored layer and optionally with a polyurethane layer, followed by insert molding with one or more layers of plastic.

3. A process as claimed in claim 2, wherein the colored layer comprises polycarbonate.

4. A process as claimed in claim 2, wherein the colored layer comprises polyarylate.

* * * * *